(12) United States Patent
Lugli et al.

(10) Patent No.: US 10,289,135 B2
(45) Date of Patent: May 14, 2019

(54) CONTROL ELECTRONICS FOR A PROCESS DEVICE AND METHOD FOR OPERATION THEREFOR

(71) Applicant: Endress + Hauser Wetzer GmbH + CO. KG, Nesselwang (DE)

(72) Inventors: Roberto Lugli, Segrate (IT); Michael Korn, Marktoberdorf (DE)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 559 days.

(21) Appl. No.: 14/652,599

(22) PCT Filed: Dec. 6, 2013

(86) PCT No.: PCT/EP2013/075771
§ 371 (c)(1),
(2) Date: Jun. 16, 2015

(87) PCT Pub. No.: WO2014/095420
PCT Pub. Date: Jun. 26, 2014

(65) Prior Publication Data
US 2015/0338860 A1    Nov. 26, 2015

(30) Foreign Application Priority Data
Dec. 21, 2012   (DE) .................. 10 2012 113 047

(51) Int. Cl.
*G05B 23/02*   (2006.01)
*G05F 1/10*    (2006.01)
(Continued)

(52) U.S. Cl.
CPC .......... *G05F 1/10* (2013.01); *G05B 19/0425* (2013.01); *G05B 19/4184* (2013.01);
(Continued)

(58) Field of Classification Search
None
See application file for complete search history.

(56) References Cited

U.S. PATENT DOCUMENTS 7,098,798 B2   8/2006   Huisenga et al.
8,598,865 B2   12/2013  Karbula et al.
(Continued)

FOREIGN PATENT DOCUMENTS

DE   102008001832 A1   11/2009
DE   102009014252 A1   9/2010
(Continued)

OTHER PUBLICATIONS

English Translation of International Preliminary Report on Patentability, WIPO, Geneva, dated Jun. 23, 2015.
(Continued)

*Primary Examiner* — Qing Yuan Wu
(74) *Attorney, Agent, or Firm* — Bacon & Thomas, PLLC

(57) ABSTRACT

Control electronics for a two-wire process device, which two-wire process device can be connected to a two-wire loop. The control electronics comprises an input circuit and a control unit connected to the input circuit, wherein the input circuit is used in a first operating mode to set a current and/or voltage in the two-wire loop by means of a control signal transmitted by the control unit. The input circuit is used in a second operating mode to automatically, in particular independently of the control unit or independently of the control signal transmitted by the control unit, to set the current and/or the electric voltage in the two-wire loop.

18 Claims, 1 Drawing Sheet

(51) Int. Cl.
*G05B 19/042* (2006.01)
*G05B 19/418* (2006.01)

(52) U.S. Cl.
CPC ......... *G05B 23/02* (2013.01); *G05B 23/0205* (2013.01); *G05B 2219/21158* (2013.01); *G05B 2219/25189* (2013.01); *G05B 2219/25191* (2013.01); *G05B 2219/25428* (2013.01); *G05B 2219/33197* (2013.01)

(56) References Cited

U.S. PATENT DOCUMENTS

2005/0168343 A1  8/2005  Longsdorf et al.
2015/0338860 A1  11/2015 Lugli et al.

FOREIGN PATENT DOCUMENTS

| EP | 2439711 A1    | 4/2012  |
| WO | 2009138315 A1 | 11/2009 |
| WO | 2010106098 A1 | 9/2010  |
| WO | 2014095420 A1 | 6/2014  |

OTHER PUBLICATIONS

International Search Report, EPO, the Netherlands, dated Mar. 4, 2014.
German Search Report, German PTO, dated Jul. 30, 2013.

CONTROL ELECTRONICS FOR A PROCESS DEVICE AND METHOD FOR OPERATION THEREFOR

TECHNICAL FIELD

The invention relates to control electronics for a process device, a process device, a method for operating the process device, a computer program product and use of the method.

BACKGROUND DISCUSSION

From the prior art, a device for increasing functional safety by monitoring the current set in a two-wire current loop has become known from European Patent, EP 2274656 A1. For this, an evaluation unit is provided which monitors the current set by the current regulator in the two-wire current loop. In the event of a defect, the current controller (OPV) leaves its operating range, to compensate for a leakage current for example. This can be detected by the evaluation unit and a corresponding error signal can be initiated.

However, here the disadvantage is that an error in the control electronics itself cannot be identified, and it is only possible to check whether the transmitted signal was also set in the current loop.

SUMMARY OF THE INVENTION

It is thus an object of the invention to ensure a correct, in particular a specified, value of a current and/or voltage in a two-wire loop, even in the event of an error in the control electronics or as a result of increased electricity demand by the control electronics, such as a voltage drop resulting therefrom.

The object is achieved according to the invention by a control electronics for a process device, a process device, a method for operating the process device, a computer program product and by use of the method.

With regard to the control electronics, the object is achieved by a control electronics for a two-wire process device, which two-wire process device can be connected to a two-wire loop, the control electronics having an input circuit and a control unit connected to said input circuit, the input circuit being used in a first operating mode to set a current and/or voltage in the two-wire loop by means of a control signal transmitted by the control unit, and the input circuit being used in a second operating mode to automatically set the current and/or the electric voltage in the two-wire loop. If, therefore, the control unit suffers a defect or can no longer be operated for any other reason or has been turned off, the regular operation, in particular operation corresponding to a standard, of the two-wire current loop can thus nevertheless be ensured by the proposed control electronics or input circuit.

In one embodiment of the control electronics, the input circuit and the control unit are connected to each other via a digital data bus via which the control signal is transmitted. The data bus may be a process device-internal bus, such as an I²C bus.

In a further embodiment of the control electronics, the control signal is a control command. The control command can thus specify a current or a voltage which should be set in the two-wire current loop. In particular, it is possible to switch between the first and the second operating mode based on the control command.

In another embodiment of the control electronics, the input circuit is a power module for supplying the control electronics, in particular the control unit, with electrical energy, and/or a communication module for establishing communication between the control electronics, in particular the control unit, via the two-wire loop, preferably with a higher-level unit or another process device. For example, the proposed control electronics or input circuit may be a circuit used exclusively for power consumption.

In a further embodiment of the control electronics, the input circuit comprises an actuating element and a monitoring unit, the actuating element being used for setting the current and/or voltage in the two-wire loop, the monitoring unit being used for receiving the control signal from the control unit, and/or the control unit being electrically connected to the actuating element at least intermittently, for example in the first operating mode, via the monitoring unit.

In a further embodiment of the control electronics, the operating mode of the input circuit is determined by the monitoring unit.

In a further embodiment of the control electronics, the input circuit is used to supply the control unit with electrical energy, in particular a supply voltage, preferably from the two-wire loop.

In a further embodiment of the control electronics, the operating mode of the input circuit is determined as a function of the control signal of the control unit, in particular by means of the monitoring unit.

In a further embodiment of the control electronics, the operating mode of the input circuit is determined as a function of a value of the supply voltage of the control unit, in particular by means of the monitoring unit.

In a further embodiment of the control electronics, the operating mode of the input circuit is determined as a function of the control signal of the control unit and as a function of a value of the supply voltage of the control unit, in particular by means of the monitoring unit.

In a further embodiment of the control electronics, the supply voltage has a first value between the actuating element and the monitoring unit.

In a further embodiment of the control electronics, a shunt-block, which is used to provide a supply voltage having a first value, is provided between the actuating element and the monitoring unit.

In a further embodiment of the control electronics, the input circuit further comprises a voltage transformer which is used to convert the supply voltage received by the actuating element to a second value.

In a further embodiment of the control electronics, the control unit is electrically connected at least intermittently, preferably in the first operating mode, to the monitoring unit via the voltage transformer. Otherwise, the control unit is isolated from the monitoring unit, for example in the case of the second operating mode, or the voltage supply to the control unit is interrupted.

In a further embodiment of the control electronics, the input circuit further comprises a voltage regulator, in particular a switching unit, which is used for controlling and/or for interrupting the voltage supply to the control unit, in particular for interrupting the supply voltage with which the control unit is supplied with electrical energy.

In a further embodiment of the control electronics, the supply voltage has a second value between the voltage transformer and the voltage regulator.

In a further embodiment of the control electronics, the control unit is electrically connected at least intermittently, preferably in the first operating mode, to the voltage transformer via the voltage regulator, and is preferably electrically isolated from the voltage transformer during the second operating mode.

In a further embodiment of the control electronics, the supply voltage has a third value between the voltage regulator and the control unit.

In a further embodiment of the control electronics, the monitoring unit is used to determine the first and/or the second operating mode, based on the first, second and/or third value of the supply voltage.

In a further embodiment of the control electronics, the current and/or voltage, which is taken from the two-wire loop or is adjusted in the two-wire loop by means of the actuating element, is set by means of a signal, for example a pulse-width modulated signal, which is predetermined by the monitoring circuit, for example during both the first and also during the second operating mode.

In a further embodiment of the control electronics, in the first operating mode a current value and/or a voltage value representing the control signal or the control command is set in the two-wire loop by means of the input circuit, for example by means of a PWM signal, particularly preferably by means of the monitoring unit.

In a further embodiment of the control electronics, in the second operating mode, a specified current value and/or voltage value stored in the input circuit, preferably in the monitoring unit, is set in the current loop, for example based on a PWM signal.

In a further embodiment of the control electronics, the current value and/or voltage value transmitted, set or obtained in the second operating mode by the input circuit, in particular by the monitoring unit, is an error signal or an alarm signal.

In a further embodiment of the control electronics, the current value and/or voltage value transmitted, set or obtained in the second operating mode by the input circuit, in particular by the monitoring unit, is a current value and/or a voltage value representing the control signal recently transmitted by the control unit.

In a further embodiment of the control electronics, in the second operating mode, a current and/or a voltage is set in the two-wire loop corresponding to the current and/or voltage value or the control signal which was set in a first operating mode that preferably immediately preceded the second operating mode.

In a further embodiment of the control electronics, a first pick-up between the actuating element and the monitoring unit is used for picking up a first value of the supply voltage, and/or a second pick-up between the voltage transformer and the voltage regulator is used for picking up a second value of the supply voltage, and/or a third pick-up between the voltage regulator and the control unit is used for picking up a third value of the supply voltage.

In a further embodiment of the control electronics, the actuating element, the monitoring unit, the voltage regulator and/or the voltage transformer are integrated at least partially, particularly preferably completely, in an ASIC (Application Specific Integrated Circuit) serving as an input circuit.

In a further embodiment of the control electronics, the voltage regulator, which is preferably a switching unit that is used for interrupting the voltage supply to the control unit, is activated by the monitoring unit.

In a further embodiment of the control electronics, in the event that one of the supply voltages exceeds or falls below a specified threshold value, the monitoring unit interrupts the voltage supply of the control unit, in particular by means of the voltage regulator, which is preferably a switching unit, and initiates the second operating mode.

In a further embodiment of the control electronics, the control signal transmitted by the control unit is examined for errors by means of the monitoring unit, for example, due to a fault, and in the event that the control signal transmitted by the control unit is faulty, the control unit is reset and/or the second operating mode is initiated.

In a further embodiment of the control electronics, the second operating mode is maintained by the monitoring unit for a specified period of time, and/or the second operating mode is maintained until the supply voltage exceeds or falls below a specified threshold value.

In a further embodiment of the control electronics, in the second operating mode, the current value and/or the voltage value is set independently of the control unit or independently of the control signal of the control unit in the two-wire loop or is obtained from the two-wire loop.

In a further embodiment of the control electronics, the control unit is a unit for executing functions and/or functionalities of the process device, such as detecting at least one measured value and/or processing at least one measured value.

In a further embodiment of the control electronics, the control signal further represents a communication signal to be transmitted via the two-wire loop.

In a further embodiment of the control electronics, during start-up or upon reboot of the process device, the input circuit is in the second operating mode or is operated in the second operating mode until the supply voltage, preferably between the input circuit and the control unit or between the voltage transformer and the voltage regulator, has reached a specified threshold value for supplying the control unit.

In a further embodiment of the control electronics, after the supply voltage has reached the specified threshold value for operating the control unit, the input circuit is operated in the first operating mode.

In a further embodiment of the control electronics, the input circuit, in particular the monitoring unit, comprises a buffer in which at least one control signal sent by the control unit, or a value representing this control signal, is stored.

In a further embodiment of the control electronics, the monitoring circuit activates the actuating element in such a manner that a current value and/or a voltage value, which corresponds to the value present in the buffer, is set in the two-wire loop.

With regard to the process device, the object is achieved by a process device, in particular measuring device, of process automation technology having measurement and/or control electronics according to any one of the preceding embodiments.

With regard to the method, the object is achieved by a method for operating a process device, where, in a first operating mode, by means of a control signal transmitted by a control unit, a current and/or voltage is set in the two-wire loop or is obtained from the two-wire loop by means of an input circuit, and where, in a second operating mode, the current and/or the electric voltage is automatically set by means of the input circuit in the two-wire loop or is obtained from the two-wire loop.

In a further embodiment of the method, the current and/or voltage is set independently of the control unit or independently of a control signal possibly present in the input circuit by means of the input circuit.

Furthermore, the embodiments referred to in connection with the control electronics apply mutatis mutandis to the claimed method.

With regard to the computer program product, the object is achieved by a computer program product with program code means which, when executed, are used for carrying out the method according to one of the previous embodiments. The program code means may be a programming language. The computer program product may, for example, be a computer program stored on a data carrier. For example, the computer program may be stored in a memory of the monitoring unit or the control unit. Moreover, the control unit or the monitoring unit may be operated according to the computer program.

As regards the use, the object is achieved by using the method and/or the measurement and/or control electronics according to any one of the preceding embodiments for operating a process device, in particular a measuring device.

BRIEF DESCRIPTION OF THE DRAWINGS

The invention is explained in greater detail on the basis of the following drawings. The drawings show.

DETAILED DISCUSSION IN CONJUNCTION WITH THE DRAWINGS

Figure 1:
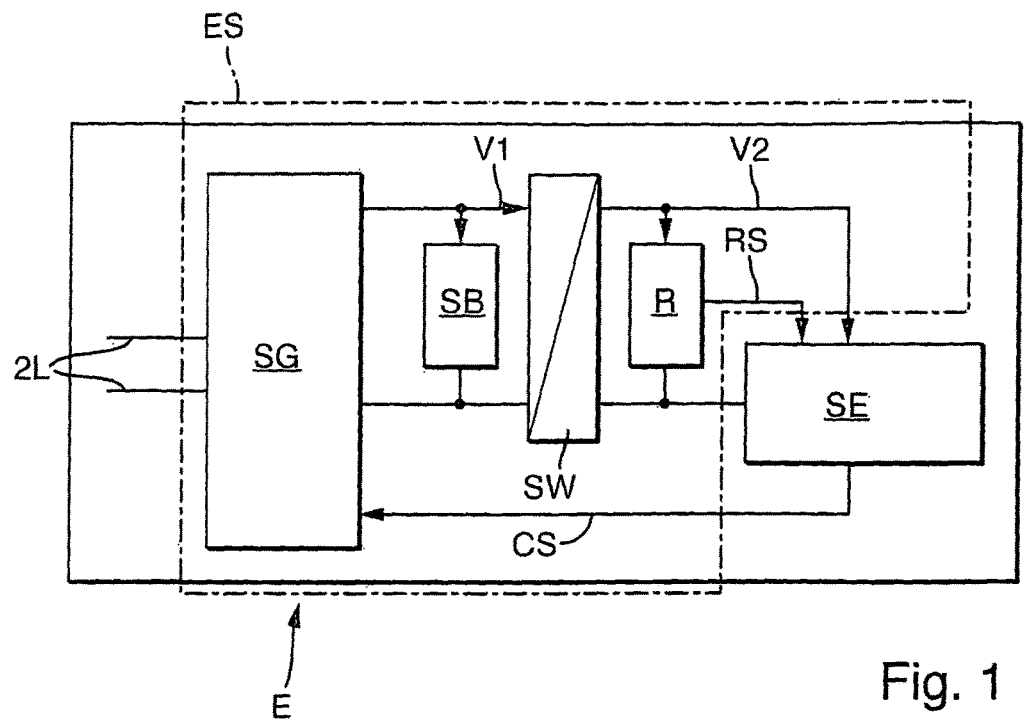
FIG. 1 is a schematic representation of an input circuit.

FIG. 1 shows an actuating element SG which is connected to a two-wire loop 2L. A current, i.e. a certain value of a current, can be set, for example, via the actuating element SG in the two-wire loop 2L.

Such two-wire loops 2L or lines are widely used in industrial applications to supply devices connected thereto with electrical energy. These two-wire lines 2L are thus used as supply lines, also referred to as a supply bus. At the same time, these two-wire lines 2L are used as an output channel to transmit, for example by means of load modulation of a device such as the proposed process device connected thereto, information such as process-relevant data, for example measured values, via the two-wire loop 2L. Such devices are therefore referred to as two-wire measuring transducers or transmitters or generally as process devices. For example, current obtained from the two-wire loop 2L via connections can be used to transmit information in analog form, for example in the form of a 4-20 mA signal, or to superimpose a digital communication signal on an analog carrier signal, such as with the Profibus PA, Foundation fieldbus or HART protocol.

As these devices are also supplied directly from the two-wire loop 2L, the average current in the two-wire loop or in the two-wire lines may not fall below a minimum value which is used for operating the device or the electronics of the device. At the same time, however, the current consumed by the device may be temporarily higher than the current present or provided in the two-wire loop 2L, as energy storage devices, such as a capacitor for example, may be present in the device.

In many applications, such as Profibus PA and Foundation fieldbus for example, it is provided that the two-wire devices must check the the current in the current loop after just a few milliseconds, shortly after starting up, i.e. supplying the devices with electrical energy and, for example, after connecting to the two-wire loop. As a result, under certain conditions the devices are permitted to change this current in the two-wire loop 2L. It is therefore important to provide an intelligent method and to specify a device, which detects any voltage drops possibly occurring, in particular in the internal voltage supply of the device, since in such a case the current set in the two-wire loop 2L is no longer subject to the control of the connected device. The same applies to the start-up of such a device. An option is thus proposed, according to which a defined current can always be set in the two-wire loop.

According to FIG. 1, the current in the two-wire current loop 2L is controlled by an actuating element SG. This element SG can be connected, for example, in parallel or in series with the two-wire loop 2L or with corresponding connections on the process device. The actuating element SG may, for example, comprise a transistor which is controlled in turn, for example, by an operational amplifier for setting a current in the current loop 2L. Downstream of the actuating element SG, in particular parallel to the actuating element SG, is a so-called shunt-block SB, which is used to discharge the current not needed by the device or the control unit SE or other applications of the device, preferably until the desired current value is reached. This may be a static component which—once installed—always allows the same current value through or a dynamic, adjustable or controllable component which, depending on a corresponding setpoint, in particular regarding the operating time of the device or the control electronics E, can let through a current value V1. Thus a voltage in the range V1 or a voltage level V1 will be set via this shunt-block.

A control signal CS originating from a control unit SE is used as a reference or control signal for setting a current in the two-wire loop 2L. The control unit SE can transmit this reference or control signal CS, for example, in the form of an analog or digital signal, such as an analogous pulse-width modulated signal.

The control unit SE is therefore used to generate a control signal CS and is supplied, in the case of a two-wire device, by energy obtained from the two-wire loop. The control unit SE is also supplied with electrical energy, i.e. a supply voltage, here with voltage level V2, via a voltage transformer SW.

The voltage transformer SW, more accurately the DC-DC converter, can be started up, for example, during starting of the process device by means of a soft start. In addition, a so-called Power On Reset may be provided, by means of which a reboot or a shutdown of the control unit SE can take place if, for example, the supply voltage of the control unit SE is present below a specified minimum voltage which, for example, must be present for safe operation of the control unit SE. If such a reset signal is present, the control unit SE can therefore no longer transmit a control signal CS which, for example, is used as a reference signal, to adjust the current in the two-wire loop 2L and therefore control of the current set in the two-wire loop 2L is lost, the result being that an arbitrary unknown value of the current and/or voltage is present in the current loop 2L. In addition, a current and/or voltage value may occur on the two-wire loop 2L, which is incorrect or does not correspond to the actual circumstances existing in the process device.

Figure 2:
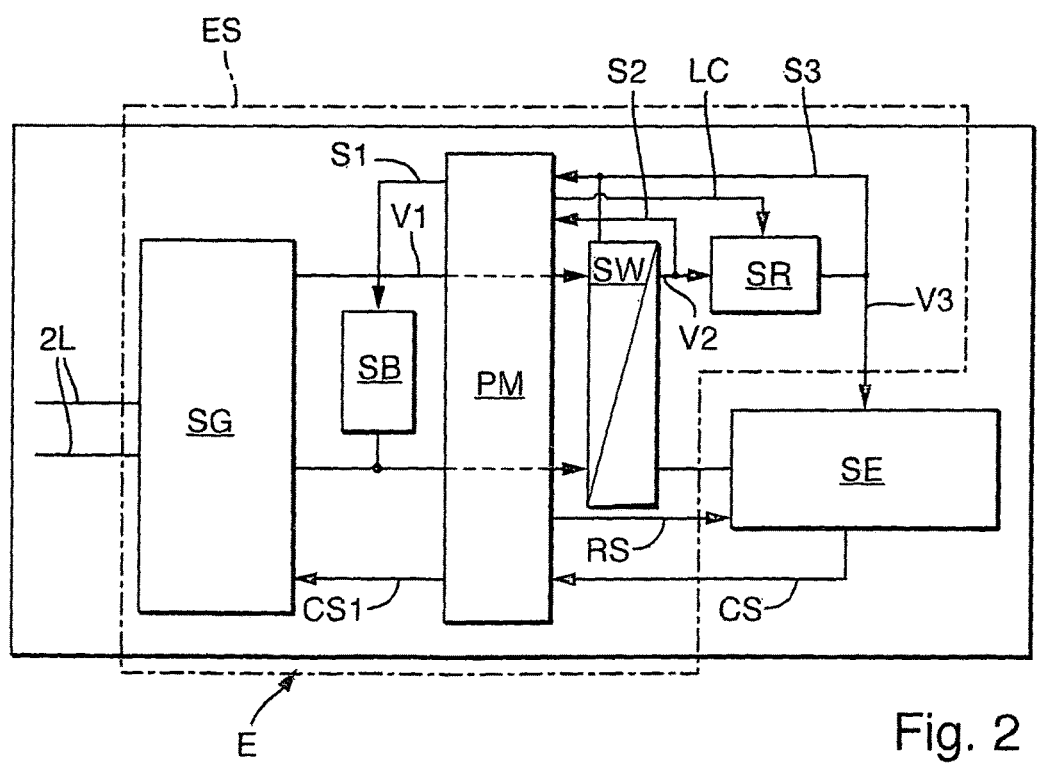
FIG. 2 is a second schematic representation of an input circuit.

FIG. 2 shows an embodiment of the proposed invention. An input circuit which uses an actuating element SG, to vary, obtain and/or impress a current and/or a voltage in the two-wire loop 2L.

Further, in addition to the components described in connection with FIG. 1, a voltage regulator SR, in the form of a so-called low dropout regulator, is also provided, which if it is turned off, interrupts the voltage supply of the control unit SE. For this purpose, a control signal LC, which is transmitted by a monitoring unit PM, can be used to control this voltage regulator SE.

The monitoring unit PM can measure the voltage and/or current at the points V1, V2, V3 and transmit the control signal LC as a function of one or more of these voltages. Further, the monitoring unit PM is used to specify the current or the voltage which is set in the two-wire loop 2L.

The monitoring unit PM itself is supplied with electrical energy by a voltage picked up at V2. This voltage picked up at V2 may further be adjusted to the voltage and current requirements of the monitoring unit PM.

During the startup of the process device or the control electronics E, operation of the monitoring unit PM is begun as soon as the voltage transformer SW is charged. Meanwhile, the control unit SE is not yet supplied with electrical energy, with the result that the voltage transformer SW is not working, that is to say the voltage supply of the control unit SE is interrupted.

The current in the two-wire loop 2L is therefore set, after starting the process device, by the monitoring unit which is in a corresponding mode of operation that corresponds to the above-mentioned second operating mode. In this operating mode, the current in the current loop is set solely and exclusively by the monitoring unit PM in the current loop, that is independently of the control unit SE or a control signal or control command CS transmitted by the control unit SE at this time. Rather, the monitoring unit PM forwards or transmits to the actuating element SG a signal CS1 stored, for example, in the monitoring unit PM, for example in the form of a pulse-width modulated signal. Further, the monitoring unit PM, which is also referred to as a power management unit, and has a certain intelligence for controlling the power consumption of the process device or the control electronics E or the control unit SE from the two-wire loop 2L, checks or controls the current in the two wire loop.

The monitoring unit PM checks the current in the two-wire loop 2L, for example by measuring the voltage level V1 or at the point V1. In addition, the monitoring unit PM checks or controls the input voltage at the (DC) voltage transformer SW by measuring the voltage at the point V1 or the voltage level V1. The input voltage at the voltage transformer can thus be controlled in such a way as to provide the control unit SE with sufficient electrical energy in the form of current and/or voltage. By measuring the voltage at point V2 or the voltage level V2, the monitoring unit PM can transmit a control signal LC for controlling the voltage regulator SR, and thus, when the voltage transformer SW has reached an operating state, for example when the voltage transformer SW is charged, it can start or control the voltage supply of the control unit SE, in particular when the voltage transformer SW has reached a safe operating state. The voltage regulator SR can then transmit a supply voltage for supplying the control unit SE with electrical energy.

During operation of the control unit SE, the monitoring unit PM also measures the voltage at the point V3 or the voltage level V3. The monitoring unit PM can also transmit a corresponding control signal LC as a function of the voltage V3 to the voltage regulator SR, which regulates and can also interrupt the voltage supply to the control unit SE. As a result, a voltage drop, for example, in the region of the control unit SE, which is initiated, for example, by an increased current requirement of the control unit SE due to a particularly power-intensive application, can be appropriately intercepted.

This can be done, for example, by interrupting the voltage supply to the control unit SE by the control signal LC being transmitted or, for example, set, by the monitoring unit PM in order to set the voltage regulator such that the voltage supply of the control unit SE is interrupted. This ensures that there is always sufficient current or voltage available to the monitoring unit PM for its own operation, so that the monitoring unit PM, instead of the control unit SE, transmits a control signal CS1 for adjusting a voltage and/or current on the two-wire loop 2L. Because the monitoring unit PM is actually supplied with electrical energy, for example, by the voltage supply at the point V2 or the voltage level V2.

Once the control unit SE is operating, i.e. is active, the monitoring unit PM hands over the control or checking of the current or voltage value set in the two-wire loop 2L to the control unit SE. The monitoring unit PM then acts as or is used as a latch. During normal operation, i.e. the above-mentioned first operating mode, the monitoring unit PM is transparent for the control signal CS transmitted by the control unit SE, and the control unit SE then directly checks the current (but still via the monitoring unit PM) or the voltage set in the two wire loop 2L, whereas during startup of the process device or in the event of an error, such as a voltage drop in the control electronics E, the monitoring unit PM takes over the control of the signal set in the two-wire loop 2L.

The monitoring unit PM then sets a specified voltage and/or current value in the two-wire loop 2L or provides such a signal at corresponding connections of the process device. Alternatively, the current and/or voltage value specified recently, i.e. before an error such as a voltage drop at one of the points V1, V2, V3, is set in the two-wire loop 2L by means of the monitoring unit PM.

In addition, the monitoring unit PM can take over the current and/or voltage value in the two-wire loop 2L even in the event of a voltage drop in the two-wire loop 2L itself and, for example, can interrupt the voltage supply to the control unit SE.

The input circuit ES can be configured, for example, in the form of an ASIC. The control unit SE can, for example, be a microprocessor which performs the functions and/or functionalities of the process device such as those of a field device or a measuring device.

Thus, an interruption or a change, especially an indeterminate and uncontrolled change, of the current or voltage set in the two-wire loop 2L is prevented.

The features and operating modes referred to in connection with FIG. 1 are also to be read for the exemplary embodiment shown in FIG. 2.

The invention claimed is:

1. A control electronics for a two-wire process device, which two-wire process device can be connected to a two-wire loop, comprising:
an input circuit, comprising an actuating element and a monitoring unit;
and a control unit connected to said input circuit, wherein:
said input circuit is used, in a first operating mode, to set a current and/or a voltage in said two-wire loop and/or to obtain the current and/or the electric voltage from the two-wire loop, by means of a control signal transmitted by said control unit; said input circuit is used, in a second operating mode, to set the current and/or the electric voltage in said two-wire loop and/or to obtain the current and/or the electric voltage from the two-wire loop, automatically, independently of said control unit or independently of the control signal transmitted by said control unit;

said actuating element is used for setting the current and/or voltage in the two-wire loop;
said monitoring unit is used for receiving said control signal from said control unit, and/or
said control unit is electrically connected at least in the first operating mode, to said actuating element via said monitoring unit.

2. The control electronics according to claim 1, wherein:
said input circuit is a power module for supplying said control unit, with electrical energy, and/or a communication module for establishing communication of said control unit, via the two-wire loop.

3. The control electronics according to claim 1, wherein:
the first or second operating mode the input circuit is used in is determined by said monitoring unit.

4. The control electronics according to claim 1, wherein:
the first or second operating mode the input circuit is used in is determined as a function of said control signal of said control unit and as a function of a value of a supply voltage of said control unit, in particular by means of said monitoring unit, and
said monitoring unit is used to determine the first and/or the second operating mode, based on a first and/or second value of the supply voltage.

5. The control electronics according to claim 4, wherein:
said supply voltage has a first value between said actuating element and said monitoring unit, and
a shunt-block, which is used to provide a supply voltage having a first value, is provided between the actuating element and the monitoring unit.

6. The control electronics according to claim 4, wherein:
said input circuit further comprises a voltage transformer which is used to convert the supply voltage received by said actuating element to a second value.

7. The control electronics according to claim 6, wherein:
during start-up or upon reboot of the process device, said input circuit is in the second operating mode or is operated in the second operating mode until said supply voltage has reached a specified threshold value for supplying said control unit; after the supply voltage has reached the specified threshold value for operating said control unit, said input circuit is operated in the first operating mode;
said input circuit, in particular said monitoring unit, comprises a buffer in which at least one control signal sent by said control unit, or a value representing this control signal, is stored; and said monitoring circuit activates said actuating element in such a manner that a current value and/or a voltage value, which corresponds to the value present in said buffer, is set in the two-wire loop.

8. The control electronics according to claim 4, wherein:
said input circuit further comprises a voltage regulator, which is used for controlling and/or for interrupting the supply voltage of the control unit.

9. The control electronics according to claim 8, wherein:
the supply voltage has a third value between said voltage regulator and said control unit.

10. The control electronics according to claim 4, wherein:
in the event that the supply voltage exceeds or falls below a specified threshold value, said monitoring unit interrupts the supply voltage of said control unit, and initiates the second operating mode, and
wherein the second operating mode is maintained until the supply voltage exceeds or falls below a specified threshold value.

11. The control electronics according to claim 1, wherein:
the current and/or voltage, which is taken from the two-wire loop or is adjusted in the two-wire loop by means of the actuating element, is set by means of a signal, which is predetermined by said monitoring unit.

12. The control electronics according to claim 1, wherein:
in the first operating mode a current value and/or a voltage value representing said control signal or a control command is set in the two-wire loop by means of the input circuit.

13. The control electronics according to claim 1, wherein:
in the second operating mode, a specified current value and/or voltage value stored in said input circuit, is set in the two-wire loop.

14. The control electronics according to claim 13, wherein:
the current value and/or the voltage value set in the second operating mode is an error signal or alarm signal.

15. The control electronics according to claim 13, wherein:
the current value and/or the voltage value set in the second operating mode is a current value and/or a voltage value representing the control signal recently transmitted by said control unit.

16. The control electronics according to claim 1, wherein:
in the second operating mode, a current and/or a voltage is set in the two-wire loop corresponding to the current and/or voltage value or said control signal which was set in the first operating mode.

17. A process device, of process automation technology having control electronics, for a two-wire process device, which can be connected to a two-wire loop wherein:
said control electronics comprising: an input circuit which comprises an actuating element and a monitoring unit; and a control unit connected to said input circuit, wherein:
said input circuit is used, in a first operating mode, to set a current and/or a voltage in the two-wire loop and/or to obtain the current and/or the electric voltage from the two-wire loop, by means of a control signal transmitted by said control unit; said input circuit is used, in a second operating mode, to set the current and/or the electric voltage in the two-wire loop and/or to obtain the current and/or the electric voltage from the two-wire loop, automatically, independently of said control unit or independently of the control signal transmitted by said control unit;
said actuating element is used for setting the current and/or voltage in the two-wire loop;
said monitoring unit is used for receiving said control signal from said control unit, and/or
said control unit is electrically connected at least in the first operating mode, to said actuating element via said monitoring unit.

18. A method of operating a process device of process automation technology having a control electronics for said process device, which two-wire process device can be connected to a two-wire loop, wherein the control electronics comprise an input circuit, which comprises an actuating element and a monitoring unit, and a control unit connected to said input circuit,
wherein the input circuit is used, in a first operating mode, to set a current and/or a voltage in the two-wire loop and/or to obtain the current and/or the electric voltage from the two-wire loop, by means of a control signal transmitted by the control unit, wherein the input circuit is used, in a second operating mode, to set the current and/or the electric voltage in the two-wire loop and/or to obtain the current and/or the electric voltage from the two-wire loop, automatically, independently of the control unit or independently of the control signal transmitted by the control unit, said actuating element is used for setting the current and/or voltage in the two-wire loop;

said monitoring unit is used for receiving said control signal from said control unit, and/or said control unit is electrically connected at least in the first operating mode, to said actuating element via said monitoring unit, comprising the steps of:

setting or obtaining in the first operating mode, by means of said control signal transmitted by said control unit, the current and/or voltage in or from said two-wire loop by means of said input circuit; and automatically setting or obtaining in the second operating mode, the current and/or the electric voltage by means of said input circuit in or from said two-wire loop.

\* \* \* \* \*